United States Patent [19]

Ideta

[11] 4,423,598

[45] Jan. 3, 1984

[54] WORKING FLUID SUPPLY SYSTEM FOR A HYDRAULIC POWER BOOSTER AND A POWER STEERING SYSTEM

[75] Inventor: Yasufumi Ideta, Tokyo, Japan

[73] Assignee: Nissan Motor Company Limited, Yokohama, Japan

[21] Appl. No.: 206,106

[22] Filed: Nov. 12, 1980

[30] Foreign Application Priority Data

Nov. 13, 1979 [JP] Japan ................ 54-145982

[51] Int. Cl.³ .................................. F15B 15/18
[52] U.S. Cl. ......................... 60/547.3; 60/430;
60/405; 60/431; 60/486; 60/582; 180/133
[58] Field of Search ............... 60/428, 430, 431, 449,
60/405, 547 B, 582, 547.3, 486; 180/133

[56] References Cited

U.S. PATENT DOCUMENTS

| | | | |
|---|---|---|---|
| 3,088,284 | 5/1963 | Aaron | 60/428 |
| 3,119,235 | 1/1964 | Lewis et al. | 60/547 B |
| 3,280,557 | 10/1966 | Sattavara | 180/133 |
| 3,434,282 | 3/1969 | Shelhart | 60/430 |
| 3,618,321 | 11/1971 | Moran | 60/582 |
| 3,631,937 | 1/1972 | Joyce | 180/133 |
| 3,675,422 | 7/1972 | Drutchas et al. | 60/405 |
| 3,677,002 | 7/1972 | Fulmer | 60/547 B |
| 3,688,498 | 9/1972 | Bach et al. | 60/547 B |
| 3,851,721 | 12/1974 | Comer, Jr. et al. | 180/133 |
| 3,940,931 | 3/1976 | Renfro et al. | 60/405 |
| 4,007,593 | 2/1977 | Baker | 60/405 |
| 4,319,455 | 3/1982 | Schuberl | 60/582 |

Primary Examiner—George L. Walton
Attorney, Agent, or Firm—Schwartz, Jeffery, Schwaab, Mack, Blumenthal & Koch

[57] ABSTRACT

A working fluid supply system for a hydraulic power booster and a power steering system includes first and second fluid supply pumps, a hydraulic power boosting apparatus, a power steering unit, various fluid passages connecting thereto and a control apparatus. The first pump supplies pressurized working fluid to a first inlet port of the hydraulic power boosting apparatus. The second pump, controlled by the control apparatus, selectively supplies pressurized working fluid to a second inlet port of the power boosting apparatus to render the fluid supply flow rate applied to the power boosting apparatus substantially constant at a predetermined level when the fluid discharge rate of the first pump is less than the predetermined level. By this, a sufficient amount of pressurized working fluid is supplied to the hydraulic power boosting apparatus to fully operate it under all actual engine speeds. On the other hand, the fluid supplied from the second pump is practically precluded from flowing into the power steering unit due to the arrangement of a control valve means provided in the power boosting apparatus to satisfy the characteristic function of the power steering system.

14 Claims, 5 Drawing Figures

WORKING FLUID SUPPLY SYSTEM FOR A HYDRAULIC POWER BOOSTER AND A POWER STEERING SYSTEM

BACKGROUND OF THE INVENTION

1. Field of the Invention

The present invention relates generally to a working fluid supply system for use with a hydraulic power booster for the braking system and a pressurized fluid operated power steering system, and more specifically to a working fluid supply system which provides a hydraulic power booster and a pressurized fluid operated power steering unit respectively with optimum amounts of pressurized working fluid under all actual engine speeds to satisfy their respective peculiar functions.

2. Description of the Prior Art

In general, working fluid supply systems for a hydraulic power booster and a pressurized fluid operated power steering system comprise a fluid supply pump driven by an engine such as an internal combustion engine, a hydraulic power booster, a power steering unit and various fluid passages interconnecting these elements. Pressurized working fluid from the fluid supply pump is initially supplied to an inlet port of the hydraulic power booster and then to an inlet port of the power steering unit via the booster, and returned to a fluid reservoir in which fluid is stored to be drawn up by the fluid supply pump. The working fluid supply system of this type generally uses a kind of fluid supply pump having a discharge rate characteristic as shown by (a) in FIG. 4. In other words, though the pump speed increases corresponding to increasing engine speed, the fluid discharge rate from the pump does not increase in proportion to the pump speed. More specifically, the fluid discharge rate will increase corresponding to the pump speed until it reaches a given speed R1 when the engine is idling, and thereafter the discharge rate is maintained constant in the range of pump speed R1 to R2, gradually decreases in the range of R2 to R3 and is again maintained constant when pump speed is higher than R3.

The reason for using this a kind of fluid pump is to satisfy the need and response characteristics of the power steering operation. More specifically, a power steering unit needs to be supplied with a relatively large amount of pressurized working fluid under a vehicle low speed to enable a driver to operate the steering wheel smoothly. On the other hand, the power steering unit needs to be supplied with a relatively small amount of pressurized working fluid under vehicle high speed (engine high speed) to stiffen the steering response with the result that the vehicle speed hardly affects the steering to achieve high steering stability. Therefore, the power steering characteristic may be satisfied by the abovementioned kind of fluid supply pump.

Figure 3:
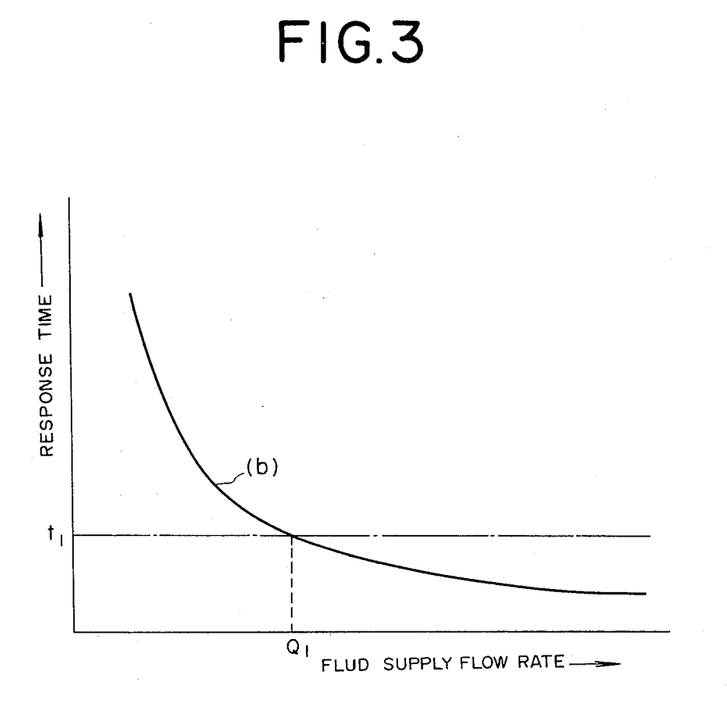
FIG. 3 is a diagram showing the response time change characteristic in general of the operation of the hydraulic power boosting apparatus relative to the fluid supply flow rates applied thereto.

However, the response time of the hydraulic power boosting operation of the power booster is determined by the working fluid flow rate applied to the power booster, and generally varies as indicated by (b) in FIG. 3. Since a long response time causes a delay in brake operation, the response time should be set to a level t1 or less to achieve the quickly responding brake operation. Therefore, the working fluid flow rate applied to the power booster should be set to a level Q1 or higher as seen from FIG. 3.

Figure 4:
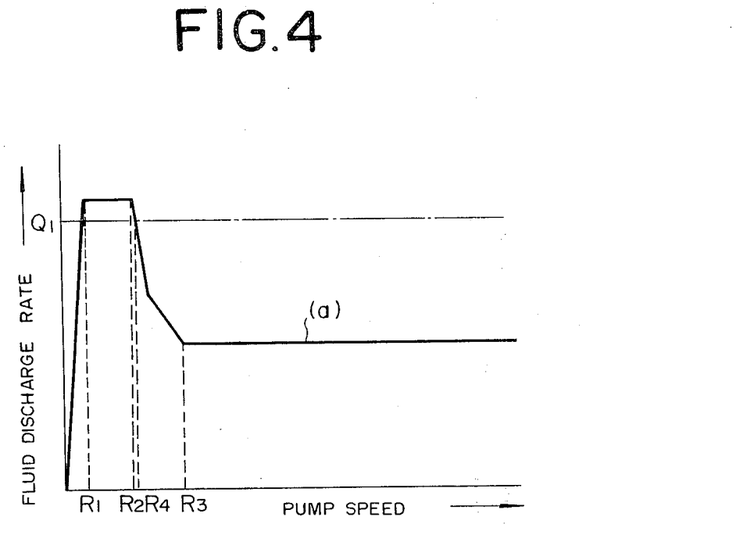
FIG. 4 is a diagram showing the discharge rate change characteristic of a fluid supply pump generally used in working fluid supply systems for satisfying the need and response characteristics of the power steering operation, relative to pump speed.

It will thus be seen that conventional working fluid supply systems using the above-referred to type of fluid supply pump permit a power steering unit to operate satisfactorily, achieving it's characteristic function under all actual engine speeds, but are not capable of accomplishing the full operation of the hydraulic power boosting apparatus, particularly when the pump speed is higher than R4, as shown in FIG. 4. In other words, the working fluid flow rate applied to the booster will become less than the above required flow rate Q1 at engine high speeds which render the pump speed higher than the level R4. This impairs the boosting operation response at vehicle high speeds despite the rapid braking particularly necessary at that time.

SUMMARY OF THE INVENTION

Therefore, it is an object of the present invention to provide a working fluid supply system for a hydraulic power booster and a power steering system which is capable of operating both the hydraulic power booster and the power steering unit optimumly well and satisfying their respective peculiar functions under all actual engine speeds by feeding them with appropriate amounts of pressurized working fluid.

The working fluid supply system of the present invention is provided with a first fluid supply pump communicating with a first inlet port of a power boost apparatus for supplying pressurized fluid thereto, a second fluid supply pump communicating with a second inlet port of the power boost apparatus for selectively supplying pressurized fluid thereto, a control valve means provided in the power boost apparatus and a control apparatus for selectively controlling the operation of the second fluid supply pump. The present system works in a way that when the working fluid flow rate from the first pump becomes less than a predetermined level, the second pump is set operating by the control apparatus for supplying sufficient fluid to the second inlet port of the power boost apparatus to maintain the fluid flow rate at the predetermined level. Therefore, the working fluid flow rate applied to the power boosting apparatus is held constant at the predetermined level under all actual engine speeds, thus preventing a delay in braking operation, even when the fluid discharge rate of the first pump is less than the predetermined level. On the other hand, the working fluid discharged from the second pump hardly affects the power steering operation due to the control valve means arrangement provided in the hydraulic power booster, so that it's characteristic function is always satisfied by the optimum amount of working fluid applied thereto.

BRIEF DESCRIPTION OF THE DRAWINGS

The present invention will become more fully understood from the detailed description given below, and from the accompanying drawings of the preferred embodiment of the present invention, which, however, are not to be limitative of the present invention in any way, but are for the purpose of elucidation and explanation only.

In the drawings.

DESCRIPTION OF THE PREFERRED EMBODIMENTS

Before explaining the overall construction of the present working fluid supply system, a hydraulic power boosting apparatus constituting a part of the system will be described in detail with reference to FIGS. 1 and 2.

A hydraulic power booster 10 comprises a generally cylindrical-shaped booster housing 12 formed with a stepped bore therewithin having a larger section 14 and a smaller section 16. The larger bore 14 slidably receives a cylindrical-shaped power piston 18 therewithin to be devided into a drain chamber 22 and a pressure chamber 24. A plug 26 is fitted to the booster housing 12 by bolts 34 under fluid sealing with a sealing ring 36 to close the booster housing 12 at one end thereof adjacent the drain chamber 22. The other end of the housing 12 slidably receives an operating rod 30 within the smaller bore 16 under fluid sealing with an annular ring 32. Bolts 38 are fixed to the booster housing 12 at the end thereof opposite the plug 26 to fit the entire power boosting apparatus to a vehicle body (not shown).

A piston return spring 40 is contractedly disposed within the drain chamber 22 urging the power piston 18 toward the pressure chamber 24, which movement is limited by a booster housing internal annular surface 42. An output rod 44 is welded to the power piston 18 on the end surface thereof facing the drain chamber 22 and penetrates through a center opening 28 of the plug 26 under fluid sealing with an annular ring 46. The projecting end 48 of the output rod 44 engages a piston cup of a tandem braking system master cylinder (not shown) to transmit the boosted force from the power piston 18. The braking master cylinder and the power boosting apparatus 10 are connected by the bolts 34 to cooperate with each other.

The power piston 18 is formed with a concentric stepped blind bore 20 therein to slidably receive a cylindrical-shaped slide valve 50, and is also formed with two annular grooves 52 and 54 on the inner circumferential surface thereof which define three lands 56, 58 and 60. The slide valve 50 is formed with two annular grooves 62 and 64 on the outer periphery thereof which define three lands 66, 68 and 70. The piston inner surface grooves and lands cooperate with the slide valve outer periphery grooves and lands to constitute a control valve means 72, i.e. a first spool valve 74, a second spool valve 76, a third spool valve 78 and corresponding passages, which selectively permit the flow of working fluid therethrough corresponding to brake pedal position. Specifically, the piston land 56 and the slide valve land 68 cooperatively constitute a first control valve 74; the piston land 58 and the slide valve land 68 cooperatively constitute a second control valve 76; and the piston land 58 and the slide valve land 70 cooperatively constitute a third control valve 78.

The slide valve 50 has a concentric stepped bore 80 in which a slide valve return spring 82 is disposed at one end fitted to the piston blind bore bottom and the other end fitted to the slide valve blind bore step 83 to bias the slide valve 50 toward the operating rod 30. The movement of the slide valve 50 by the force of the spring 82 is restricted by an operating rod end 86 as seen from FIG. 1. The operating rod 30 is prevented from slipping out through the housing smaller bore 16 by engagement of an operating rod flange portion 84 and a snap ring 88 fitted to the piston inner circumferential surface. The operating rod 30 is formed with a passage 90 communicating the pressure chamber 24 with the slide valve bore 80. The slide valve 50 is further formed with two radial passages 92 which respectively provide communication between the slide valve annular groove 64 and the slide valve bore 80.

The booster housing 12 is provided with a first inlet port 94, a second inlet port 96, an outlet port 98, a drain port 100 and a communicating passage 102. The power piston 18 is further formed with four longitudinal channels 104, 106, 108 and 110 as best ssen from FIG. 2. During the overall shifting strokes of the power piston 18, the longitudinal channel 104 communicates with the first inlet port 94, the longitudinal channel 106 communicates with the outlet pore 98 and the longitudinal channel 108 communicates with the communicating passage 102. The longitudinal channel 104 further communicates with the piston annular groove 52 through a passage 112. The longitudinal channel 106 communicates with the slide valve annular groove 62 through a passage 114 and the longitudinal channel 108 communicates with the piston annular groove 52 through a passage 116. A bolt 118 is inserted into the longitudinal channel 110 from the booster housing 12 to prevent the power piston 18 from rotating within the housing bore 14. The drain port 100 communicates with the drain chamber 22 through a passage 120. The power piston 18 is further formed with two radial passages 122 leading to the outer periphery thereof from the piston annular groove 54, which passages 122 communicate with the drain chamber 22 through corresponding two longitudinal grooves 124 formed on the outer periphery of the power piston 18.

The second inlet port 96 communicates with the pressure chamber 24 through a passage 126 formed in the booster housing 12. Since an annular radial passage 128 is formed at the end of the power piston 18 where the piston contacts the housing internal annular surface 42, communication between the second inlet port 96 and the pressure chamber 24 through the radial passage 128 is never closed, even when the power piston 18 contacts the housing internal annular surface 42.

Figure 2:
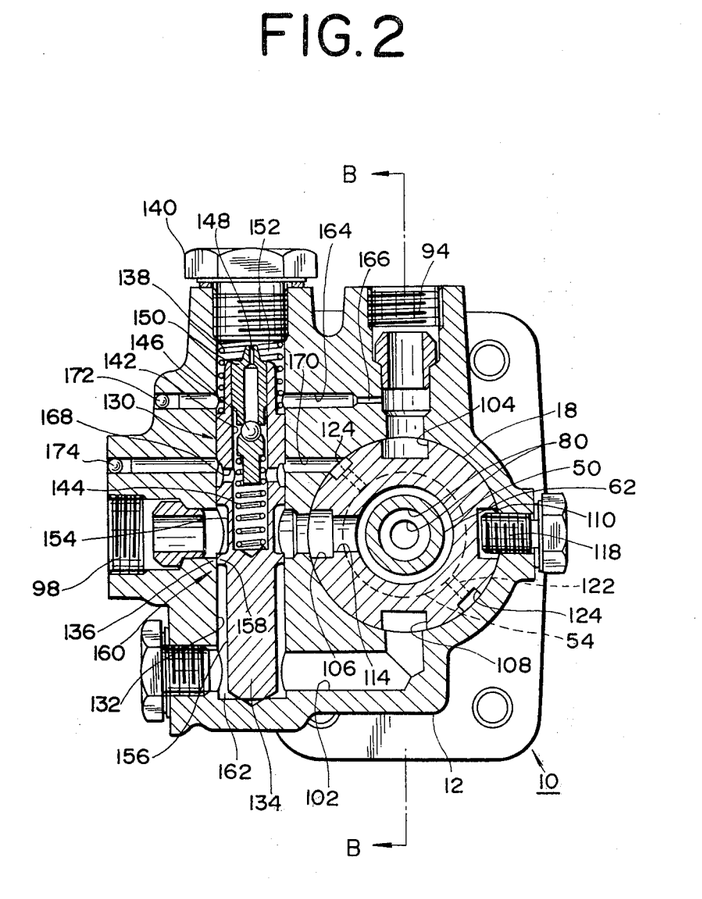
FIG. 2 is a cross-sectional view of the preferred embodiment of the hydraulic power boosting apparatus taken along line A—A in FIG. 1.

A relief valve means 130 is provided in the outlet port 98, as shown in FIG. 2, which comprises a bore 132 provided in the booster housing 12 perpendicular to the outlet port 98, and a valve member 134 slidably disposed within the bore 132 and urged downwardly by a spring 138 fitted to a plug 140 closing the bore 132 at the top end thereof. The valve member 134 is formed with a blind bore 142 having a spring 144 therewithin to bias a pilot valve 146 upwardly. The pilot valve 146 is normally set to a closed position by the force of the spring 144 to seal against a center opening 148 formed in a valve seat 150 mounted in the blind bore 142. The pilot valve 146 operates corresponding to pressure within a pilot chamber 152 defined by the valve member 134. The valve member 134 is further formed with an annular groove 154 on the outer periphery thereof facing the outlet port 98 to communicate the outlet port 98 with the first annular groove 62.

The lower part 156 of the valve member 134 is smaller in diameter to form a step 158 which, cooperating with a shoulder 136 of the booster housing 12, constitutes a thrust valve 160, and a valve chamber 162 which communicates with the communicating passage 102. The pilot chamber 152 communicates with the first inlet port 94 through a fluid passage 164 and an orifice 166 both formed in the booster housing 12. The valve member 134 is further formed with an opening 168 which communicates with the drain chamber 22 through a drain passage 170 formed in the booster housing 12 and one of the longitudinal grooves 124. Both of the outer ends of the passages 164 and 170 are closed by ball-shaped sealing members 172 and 174 pressed thereinto.

Figure 1:
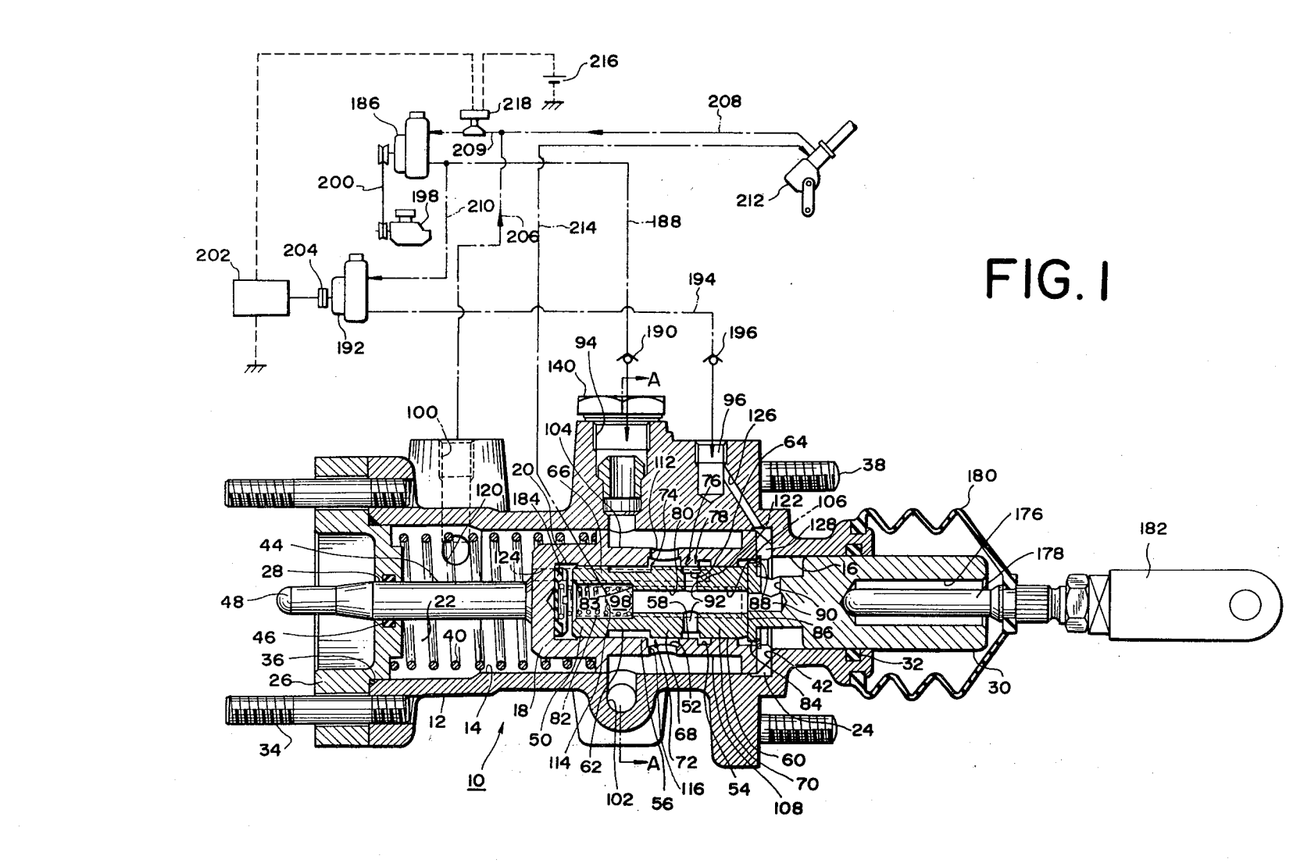
FIG. 1 is a view showing a working fluid supply system of a preferred embodiment of the present invention, wherein a hydraulic power boosting apparatus is particularly illustrated in detail in a longitudinal section taken along line B—B in FIG. 2.

As shown in FIG. 1, the operating rod 30 is formed with a blind bore 176 with a cone-shaped bottom where the front end of an input rod 178 contacts therewith, and is connected to a brake pedal (not shown) through a clevis 182 at the rear end thereof. A dust boot 180 is provided, one end thereof fitted to the booster housing 12 and the other end fitted to the input rod 178, for dust sealing of the operating rod 30. A cushion rubber 184 is stuck to the bottom of the power piston blind bore 20 to reduce the shock when the slide valve 50 engages therewith when the brake pedal is strongly depressed.

The overall construction of the working fluid supply system will be described in detail hereinbelow, particularly in view of the connection between all components constituting the present system with reference to FIG. 1.

The first inlet port 94 is connected to a discharge port of a first pump 186 through a fluid passage 188, and a check valve 190 is disposed in the fluid passage 188. The second inlet port 96 is connected to a discharge port of the second pump 192 through a fluid passage 194, and a check valve 196 is provided in the fluid passage 194. The first pump 186 includes, as in a known way, a reservoir in which fluid is stored, a flow-rate control valve and a relief valve, and has a fluid discharge rate characteristic indicated by (a) in FIG. 4. The first pump 186 is driven by an engine 198, such as an internal combustion engine, by a fan belt 200 and supplies pressurized working fluid into the first inlet port 94 through the fluid passage 188. The second pump 192 is directly connected to an output shaft of an electric motor 202 through a coupling 204, and also has its own reservoir for storing fluid which is positioned beneath the first pump reservoir to receive drained fluid from the first pump reservoir, i.e., the drained fluid is initially returned to the first pump reservoir through passages 206, 208 and 209, and then an amount of the fluid in excess of a certain level in the first pump reservoir overflows into the second pump reservoir through a fluid passage 210. The drain port 100 is connected to the first pump reservoir through the fluid passages 206 and 209. The outlet port 98 is connected to the working fluid inlet port of a power steering unit 212, including a steering system operation valve of the power steering system, through a fluid passage 214. The working fluid outlet port of the power steering unit 212 is connected to the first pump reservoir through the fluid passages 208 and 209.

The second pump 192 is driven by the electric motor 202 connected to an electric power supply 216 through a switch 218 positioned between the power steering unit 212 and the first pump 186, and selectively supplies pressurized working fluid to the second inlet port 96 through the fluid passage 194. The switch 218 selectively controls the electric power supplied to the electric motor 202 from the electric power supply 216 in response to changes in fluid pressure in the fluid passage 209 to control the operation of the second pump 192. In more detail, when the first pump speed increases higher than a predetermined speed R2 in FIG. 4 to gradually decrease the fluid discharge rate of the first pump 186, the fluid pressure in the fluid passage 209 also decreases, which causes the switch 218 to be set to "ON" position to actuate the electric motor 202 to drive the second pump 192 for supplying the pressurized working fluid in an amount (d) in FIG. 5 (the difference between the fluid flow rate required by the hydraulic power booster 10 (c) and the fluid flow rate supplied by the first pump 186 at speeds above R3 (a)) to the second inlet port 96 in order to maintain the working fluid supply flow rate above Q1 under all actual engine speeds. When the pump speed is equal to or lower than R2, the switch 218 is set to "OFF" position. By this, the operation of the power boost apparatus 10 is fully achieved and the response time thereof from the point of depressing the brake pedal is minimized.

It is to be noted that the switch 218 may be arranged to be set to "ON" position when the first pump speed becomes higher than R4 to maintain the fluid discharge rate at the required flow rate Q1 in FIGS. 3 and 4, and to "OFF" position when the first pump speed becomes R4 or lower.

It is also to be noted that the switch may be arranged to actuate the electric motor 202 to drive the second pump 192 upon the occurrence of a predetermined minimum fluid pressure in the fluid passage 209, and that the switch may be arranged to operate in response directly to engine speed or the first pump speed.

The operation of the present working fluid supply system will be described in detail hereinbelow.

In the range of the first pump speed between R1 and R2, since a sufficient amount of the working fluid is supplied to the first inlet port 94 from the first pump 186 to achieve a sufficient short response time of the boosting operation, and the fluid pressure in the fluid passage 209 is maintained constant, the switch 218 is retained to "OFF" position so that the electric motor 202 does not operate. Therefore, the second pump 192 does not operate and supplies no working fluid to the second inlet port 96, so that the hydraulic power booster 10 is supplied with the pressurized working fluid only at the first inlet port 94 from the first pump 186 through the fluid passage 188 and the check valve 190.

The present working fluid supply system normally operates as described below.

In the released position of the brake pedal where the hydraulic power booster 10 is in non-operating position as shown in FIG. 1, the fluid fed to the first inlet port 94 flows through the piston longitudinal channel 104, the piston passage 112, the first control valve 74, the piston passage 114 and into the outlet port 98. From there, the fluid flows through the fluid passage 214 to the power steering unit 212 to operate the power steering system, and thereafter returns to the first pump reservoir through the fluid passages 208 and 209. At the same time, the fluid fed to the first inlet port 94 also flows into the valve chamber 162 through the piston longitudinal channel 104, the piston passage 112, the annular groove 52, the piston passage 116, the longitudinal channel 108 and the communicating passage 102. This fluid, however, is not permitted to flow into the outlet port 98, as the thrust valve 160 is closed to interrupt the fluid to flow therethrough.

In this released position, the pressurized fluid is precluded from flowing into the pressure chamber 24 due to the second control valve 76 being closed, but is permitted to flow into the drain port 100 through the operating rod passage 90, the slide valve bore 80, the radial passages 92, the third control valve 78, the radial passages 122, the longitudinal grooves 124 and the drain chamber 22, and further into the first pump reservoir through the fluid passages 206 and 209. Therefore, the power piston 18 is urged by the piston return spring 40 to the position shown in FIG. 1, releasing the force applied to the tandem braking system master cylinder.

When the brake pedal is applied from the released position, the operating rod 30 is pushed by the input rod 178 through the clevis 182 to shift the slide valve 50 to the left in FIG. 1. By this, the first control valve 74 is gradually closed to reduce the flow of the hydraulic fluid therethrough and the third valve 78 is also gradually closed to reduce the flow of the hydraulic fluid therethrough. As the slide valve 50 shifts more to the left, the third valve 78 is completely closed and the second control valve 76 is gradually opened to permit the flow of the hydraulic fluid therethrough to the pressure chamber 24. At this time, since the first control valve 74 admits only a small amount of the hydraulic fluid therethrough and the third control valve is completely closed, the boost pressure generated upstream of the first and second control valves 74 and 76 is applied to the pressure chamber 24 through the second control valve 76 to act on the right end of the power piston 18 in FIG. 1 to shift it toward the drain chamber 22 against the force of the piston return spring 40. This power piston movement transmits the boosted power to the braking system master cylinder through the output rod 44 for braking the vehicle and is stopped when a new balance is attained.

It should be noted that though the hydraulic pressure generated at this time is also applied to the fluid passages 188 and 194 through the first inlet port 94 and the second inlet port 96, the check valves 190 and 196 function to preclude the fluid pressure from backing up toward the first and second pumps 186 and 192.

Also, it should be noted that the power steering system of course also works in this position because the working fluid is continued to be fed to the power steering unit 212 through the outlet port 98 due to the first control valve 74 being open to permit the flow of the fluid therethrough.

When the brake pedal is further depressed, the first control valve 74 is completely closed and the second control valve 76 is opened wider to permit more fluid therethrough to the pressure chamber 24, where the front end of the slide valve 50 engages the cushion rubber 184 provided at the bottom of the power piston blind bore 20. At this time, the maximum hydraulic pressure is generated upstream of the first and second control valves 74 and 76, and is applied to the pressure chamber 24 through the second control valve 76 to act on the right end of the power piston 18 in FIG. 1 to strongly push it toward the drain chamber 22 for rapid braking of the vehicle.

The above-mentioned maximum hydraulic pressure is determined by the relief valve means 130, more specifically, by the set forces of the springs 138 and 144 as described hereinbelow.

In this applied position of the brake pedal, the boost pressure applied to the pressure chamber 24 is also applied to the pilot valve 146 through the first inlet port 94, the orifice 166, the fluid passage 164, the pilot chamber 152 and the valve seat opening 148. When the hydraulic pressure applied to the pilot valve 146 overcomes the set force of the spring 144, the pilot valve 146 is forced to pressed down in FIG. 2 to permit the pressurized fluid flowing therethrough. This pressurized fluid is then fed to the drain chamber 22 through the opening 168, the drain passage 170 and one of the longitudinal grooves 124 to be drained out through the drain port 100 into the first pump reservoir. The orifice 166 causes a pressure drop in the pressurized fluid flowing therethrough, resulting in a lower pressure in the pilot chamber 152.

At the same time, the boost pressure applied to the pressure chamber 24 is also applied to the valve chamber 162 through the piston passage 116, the longitudinal channel 108 and the communicating passage 102. When the force differential due to the fluid pressure difference between the valve chamber 162 and the pilot chamber 152 overcomes the set force of the spring 138, the valve member 134 shifts upwardly to open the thrust valve 160 to permit the flow of the pressurized fluid therethrough into the power steering unit 212 to operate the power steering system even when the first control valve 74 is completely closed.

As described above, the relief valve means 130 functions to control the fluid pressure applied to the inside of the power boosting apparatus 10 within a predetermined range to avoid damage to the various parts thereof. At the same time, the relief valve means 130 enables the power steering system to operate by supplying the excessive fluid thereto even when the power booster (10) is in full operation.

In the event the first pump 186 encounters some trouble or otherwise discharges insufficient working fluid pressure, the switch 218 is set to "ON" position to actuate the electric motor 202 to drive the second pump 192 which supplies the pressurized fluid to the second inlet port 96. In this event, the present system works as follows.

When the brake pedal is in the released position, the pressurized fluid supplied to the second inlet port 96 initially flows into the pressure chamber 24 through the housing passage 126. However, since the third valve 78 is open to communicate the pressure chamber 24 with the drain port 100, no boost pressure is built up within the pressure chamber 24. Since the hydraulic fluid is drained only from the drain port 100, no fluid is supplied to operate the power steering unit 212.

On the other hand, when the brake pedal is depressed to urge the slide valve 50 to the left in FIG. 1, since the third valve 78 is closed to interrupt the flow of the hydraulic fluid therethrough, the boost pressure is generated within the pressure chamber 24 to shift the power piston 18 toward the drain chamber 22. Therefore, even when minimum fluid pressure is supplied from the first pump 186, the minimum boosting force necessary to safely brake the vehicle is obtained, so that danger due to insufficient braking can be avoided. It is to be noted that though a small amount of the working fluid is, when the brake pedal is slightly depressed, supplied to the power steering unit 212 due to the first control valve 74 being slightly open, this fluid hardly affects the power steering operation because of its very small amount.

It is also to be noted that, although the second control valve 76 is open to apply the boost pressure generated within the pressure chamber 24 to the fluid passage 188 through the first inlet port 94, the fluid pressure is prevented from backing up toward the first pump 186 by the check valve 190, so that the boosting performance is not lowered.

Lastly, when the first pump 186 is normally operating and the first pump speed exceeds the level R2, the flow-rate switch 218 is set to "ON" position to permit the second pump 192 to supply the pressurized working fluid to the second inlet port 96 as described before, so that the power boosting apparatus 10 is supplied with the substantially constant working fluid flow rate above the required level Q1 even during the first pump speeds higher than R2.

The pressurized fluid supplied to the first and second inlet ports 94 and 96 functions in the same manner as in the single operation of the first and second pumps 186 and 192, regardless of whether the brake pedal is in the released or applied position. Therefore, in the applied position, the boosting operation is achieved by the working fluid from both the first and second pumps 186 and 192 to make the response time shorter than t1 in FIG. 3, so that high response of the boosting operation is achieved even when the first pump 186 discharges a less amount of the working fluid than is required. Moreover, regardless of whether the brake is in the applied position or released position, since the working fluid supplied from the second pump 192 hardly affects the power steering operation as described before, the need and response characteristic of the power steering function is optimumly satisfied in accordance with the discharge rate characteristic of the first pump 186 shown in FIG. 4.

Figure 5:
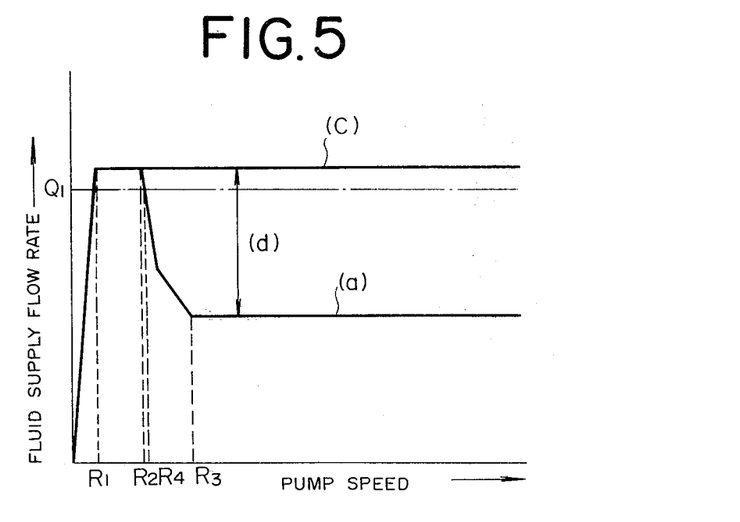
FIG. 5 is a diagram showing the fluid supply flow rate change characteristic of the preferred embodiment applied to the hydraulic power booster relative to pump speed, in comparison with the conventional one.

In the present embodiment, as described above, since the second pump 192 is driven whenthe first pump 186 discharges a less amount of the working fluid than is required, the working fluid flow rate applied to the hydraulic power booster 10 is set at a constant level greater than the level Q1 under all actual engine speeds, as shown by (c) in FIG. 5, to make the response time of the hydraulic boosting operation shorter than t1 in FIG. 3. Therefore, improved response of the hydraulic power booster 10 can be achieved. Further, the working fluid supplied from the second pump 192 hardly affects the power steering operation due to the control valve means 72 provided within the hydraulic power booster 10, so that the power steering operation is achieved substantially only by the fluid supplied from the first pump 186 to optimumly satisfy the power steering characteristic. Moreover, even in the event the first pump 186 discharges insufficient fluid, the second pump 192 is driven to supply the working fluid to the hydraulic power booster 10, so that at least the minimum boosting force is achieved to safely brake the vehicle.

It is to be understood that the invention is not to be limited to the embodiment described in the foregoing, and that various changes and modifications may be made without departing from the spirit and scope of the invention as defined in the appended claims. For example, the second pump 192 may be driven by various means which can control the operation of the second pump 192 to maintain a working fluid flow rate applied to the hydraulic power booster 10 at a predetermined level.

What is claimed is:

1. A working fluid supply system for an automotive vehicle, comprising:
    (a) a first pump driven by an engine of the automotive vehicle, said first pump having a fluid discharge rate which decreases below a predetermined level in response to an engine speed beyondd a predetermined level;
    (b) a second pump;
    (c) control means for operating said second pump when the discharge rate of said first pump is less than said predetermined level; and
    (d) a hydraulic power boosting apparatus having:
        (1) a first inlet port communicating with said first pump and supplied with pressurized working fluid therefrom;
        (2) a second inlet port communicating with said second pump and supplied with pressurized working fluid therefrom when the discharge rate of said first pump is less than the predetermined level;
        (3) an outlet port communicating with a power steering unit;
        (4) a drain port communicating with fluid reservoir means for restoring the fluid thereto;
        (5) a first passageway communicating said first inlet port with said outlet port through a first valve;
        (6) said first valve being open to permit the flow of the working fluid therethrough when a brake pedal is in a released position and being closed to prevent the flow of the working fluid therethrough when the brake pedal is in an applied position;
        (7) a second passageway communicating said first inlet port with a power boosting chamber through a second valve, said power boosting chamber defined within said power boosting apparatus;
        (8) said second valve being closed to prevent the flow of the working fluid therethrough when the brake pedal is in a released position and being open to permit the flow of the working fluid therethrough when the brake pedal is in an applied position;
        (9) a third passageway communicating said power boosting chamber with said drain port through a third valve;
        (10) said third valve being open to permit the flow of the working fluid therethrough when the brake pedal is in a released position and being closed to prevent the flow of the working fluid therethrough when the brake pedal is in an applied position; and
        (11) a fourth passageway communicating said second inlet port with said power boosting chamber;
    (e) said power steering unit being operated by the pressurized working fluid supplied from said outlet port and being in communication with said fluid reservoir means for restoring the working fluid thereto.

2. A working fluid supply system as set forth in claim 1, wherein said power boosting apparatus further comprises:

a fifth passageway communicating said first inlet port with said outlet port through a fourth valve, said fourth valve being operative to release a fluid pressure in excess of a predetermined pressure into said outlet port in response to a build up of excessive fluid pressure within said power boosting apparatus.

3. A working fluid supply system for an automotive vehicle, comprising:

(a) a first pump driven by an engine of the automotive vehicle, said first pump having a fluid discharge rate which decreases below a predetermined level in response to an engine speed beyond a predetermined level;

(b) a second pump;

(c) control means for operating said second pump when the discharge rate of said first pump decreases below said predetermined level; and (d) a hydraulic power boosting apparatus having:

(1) a housing having a blind bore therein, a first inlet port in said housing communicating with said first pump and supplied with pressurized working fluid therefrom, a second inlet port in said housing communicating with and supplied with pressurized working fluid from said second pump when the discharge rate of said first pump is less than said predetermined level, an outlet port communicating with a power steering unit, and a drain port communicating with fluid reservoir means for restoring the fluid thereto;

(2) a power piston slidably received within said housing blind bore to subdivide said bore into a drain chamber and a power boosting chamber, said power piston having a blind bore therein;

(3) a slide valve slidably received within said piston blind bore, one end of which is drivingly connected to a brake foot pedal through a connecting means;

(4) a first passageway communicating said first inlet port with said outlet port through a first valve;

(5) said first valve being open to permit the flow of the working fluid therethrough when said pedal is in a released position and being closed to prevent the flow of the working fluid therethrough when said pedal is in an applied position;

(6) a second passageway communicating said first inlet port with said power boosting chamber through a second valve;

(7) said second valve being closed to prevent the flow of the working fluid therethrough when said pedal is in a released position and being open to permit the flow of the working fluid therethrough when said pedal is in an applied position;

(8) a third passageway communicating said power boosting chamber with said drain port through a third valve;

(9) said third valve being open to permit the flow of the working fluid therethrough when said pedal is in a released position and being closed to prevent the flow of the working fluid therethrough when said pedal is in an applied position; and (10) a fourth passageway communicating said second inlet port with said power boosting chamber;

(e) said power steering unit being operated by the pressurized working fluid supplied from said outlet port and being in communication with said fluid reservoir means for restoring the working fluid thereto.

4. A working fluid supply system for an automotive vehicle, comprising:

(a) a first pump driven by an engine of the automotive vehicle, said first pump having a fluid discharge rate which decreases below a predetermined level in response to an engine speed beyond a predetermined value;

(b) a second pump;

(c) control means for operating said second pump when the discharge rate of said first pump is less than the predetermined level;

(d) a hydraulic power boosting apparatus having:

(1) a housing with first and second communicating blind bores, a first inlet port communicating with said first pump and supplied with pressurized working fluid from said first pump, a second inlet port communicating with said second pump and supplied with pressurized working fluid therefrom when the discharge rate of said first pump is less than the predetermined level, an outlet port communicating with said second blind bore and a power steering unit, and a drain port communicating with fluid reservoir means of said first and second pumps for restoring the fluid thereto;

(2) a power piston slidably received within said housing first blind bore to subdivide said first bore into a drain chamber and a power boosting chamber, said power piston having a blind bore therein;

(3) a slide valve slidably received within said piston blind bore, one end of said slide valve being drivingly connected to a braking foot pedal through a connecting means;

(4) a first passageway communicating said first inlet port with said outlet port through a first valve;

(5) said first valve being open to permit the flow of the working fluid therethrough when said foot pedal is in a released position and being closed to prevent the flow of the working fluid therethrough when said foot pedal is in an applied position;

(6) a second passageway communicating said first inlet port with said power boosting chamber through a second valve;

(7) said second valve being closed to prevent the flow of the working fluid therethrough when said foot pedal is in a released position and being open to permit the flow of the working fluid therethrough when said foot pedal is in an applied position;

(8) a third passageway communicating said power boosting chamber with said drain port through a third valve;

(9) said third valve being open to permit the flow of the working fluid therethrough when said foot pedal is in a released position and being closed to prevent the flow of the working fluid therethrough when said foot pedal is in an applied position;

(10) a fourth passageway communicating said second inlet port with said power boosting chamber;

(11) a fifth passageway communicating said first inlet port with said outlet port through a fourth valve;

(12) said fourth valve having a valve member slidably enclosed within said housing second blind bore and urged by a resilient member, said valve member adapted to shift against a set force of said resilient member to release a fluid pessure in excess of a predetermined pressure into said outlet port when an excessive fluid pressure is built up within said boosting apparatus;

(e) said power steering unit being operated by the pessurized working fluid supplied from said outlet port and being in communication with said fluid reservoir means for restoring the fluid thereto.

5. A working fluid supply system for an automotive vehicle, comprising:
(a) a first pump powered by an engine of the automotive vehicle and being of the type characterized by a decrease in its fluid discharge rate when the engine speed is above a predetermined level;
(b) a second pump;
(c) means for operating said second pump;
(d) a hydraulic power boosting apparatus having:
   (1) a first inlet port communicating with said first pump and supplied with fluid therefrom;
   (2) a second inlet port communicating with said second pump and supplied with fluid therefrom;
   (3) an outlet port;
   (4) a drain port communicating with fluid reservoir means for restoring the fluid thereto;
   (5) a power boosting chamber;
(e) a hydraulic power steering system communicating with said outlet port to be supplied with fluid therefrom and communicating with said fluid reservoir means for restoring fluid thereto;
(f) valve means associated with said power boosting apparatus,
   said valve means established communication between said first inlet port and said outlet port when a brake pedal is in a released position and interrupting communication therebetween when the brake pedal is in an applied position,
   said valve means interrupting communication between said first inlet port and said power boosting chamber when the brake pedal is in a released position and establishing communication therebetween when the brake pedal is in an applied position,
   said valve means establishing communication between said power boosting chamber and said drain port when the brake pedal is in a released position and interrupting communication therebetween when the brake pedal is in an applied position; and
   said valve means permitting the fluid from said second pump to flow into said drain port when the brake pedal is in a released position and permitting the fluid from said second pump to generate boosted power in said power boosting chamber when the brake pedal is in an applied position.

6. A working fluid supply system as set forth in claim 5, wherein said means for operating said second pump detects the fluid discharge rate of said first pump and operates said second pump only when the fluid discharge rate of the first pump is less than a predetermined level.

7. A working fluid supply system as set forth in claim 5, wherein said means for operating said second pump detects the engine speed and operates said second pump only when the engine speed is above the predetermined level.

8. A working fluid supply system for an automotive vehicle, comprising:
(a) a first pump associated with an engine of the automotive vehicle and being of the type which is characterized by a decrease in its fluid discharge rate when the engine speed is above a predetermined level;
(b) a second pump;
(c) means for operating said second pump;
(d) a hydraulic power boosting apparatus, having:
   (1) a housing with a blind bore therein, a first inlet port in said housing communicating with said first pump and supplied with the fluid therefrom, a second inlet port in said housing communicating with said second pump and supplied with the fluid from said second pump, an outlet port, and a drain port communicating with fluid reservoir means for restoring the fluid thereto;
   (2) a power piston slidably received within said housing blind bore to subdivide said bore into a drain chamber and a power boosting chamber, said power piston having a blind bore therein;
   (3) a slide valve slidably received within said piston blind bore, one end of which is drivingly connected to a braking foot pedal through a connecting means;
(e) a hydraulic power steering system communicating with said outlet port to be supplied with the fluid therefrom and communicating with said fluid reservoir means for restoring the fluid thereto;
(f) a valve means associated with said power boosting apparatus,
   said valve means being open to establish communication between said first inlet port and said outlet port when said foot pedal is in a released position and being closed to interrupt communication therebetween when said foot pedal is in an applied position,
   said valve means being closed to interrupt communication between said first inlet port and said power boosting chamber when said foot pedal is in a released position and being open to establish communication therebetween when said foot pedal is in an applied position,
   said valve means being open to establish communication between said power boosting chamber and said drain port when said foot pedal is in a released position and being closed to interrupt communication therebetween when said foot pedal is in an applied position; and
   said valve means permitting the fluid from said second pump to flow into said drain port when said foot pedal is in a released position and permitting the fluid from said second pump to generate boosted power in said power boosting chamber when said foot pedal is in an applied position.

9. A working fluid supply system as set forth in claim 8, wherein said valve means is cooperatively defined by said power piston and said slide valve.

10. A working fluid supply system as set forth in claim 8, wherein said valve means is further operable to release excessive fluid pressure built up within said power boosting apparatus.

11. A working fluid supply system for an automotive vehicle, comprising:
(a) a first pump driven by an engine of the automotive vehicle, said first pump having a fluid discharge rate which decreases below a predetermined level in response to an engine speed beyond a predetermined level;
(b) a second pump;
(c) control means for operating said second pump when the discharge rate of said first pump decreases below said predetermined level; and
(d) a hydraulic power boosting apparatus having:
(1) a housing having a blind bore therein, a first inlet port in said housing communicating with said first pump and supplied with pressurized working fluid therefrom, a second inlet port in said housing communicating with and supplied with pressurized working fluid from said second pump when the discharge rate of said first pump is less than said predetermined level, an outlet port communicating with a power steering unit, and a drain port communicating with fluid reservoir means for restoring the fluid thereto;
(2) a power piston slidably received within said housing blind bore to subdivide said bore into a drain chamber and a power boosting chamber, said power piston having a blind bore therein;
(3) a slide valve slidably received within said piston blind bore, one end of which is drivingly connected to a brake foot pedal through a connecting means;
(4) a first passageway communicating said first inlet port with said outlet port through a first valve;
(5) said first valve being open to permit the flow of the working fluid therethrough when said pedal is in a released position and being closed to prevent the flow of the working fluid therethrough when said pedal is in an applied position;
(6) a second passageway communicating said first inlet port with said power boosting chamber through a second valve;
(7) said second valve being closed to prevent the flow of the working fluid therethrough when said pedal is in a released position and being open to permit the flow of the working fluid therethrough when said pedal is in an applied position;
(8) a third passageway communicating said power boosting chamber with said drain port through a third valve;
(9) said third valve being open to permit the flow of the working fluid therethrough when said pedal is in a released position and being closed to prevent the flow of the working fluid therethrough when said pedal is in an applied position; and
(10) a fourth passageway communicating said second inlet port with said power boosting chamber;
(e) said power steering unit being operated by the pressurized working fluid supplied from said outlet port and being in communication with said fluid reservoir means for restoring the working fluid thereto; and
wherein said fluid reservoir means comprises:
(f) a first fluid reservoir in which the fluid is stored to be withdrawn by said first pump for supply to said first inlet port; and
(g) a second fluid reservoir in which the fluid is stored to be withdrawn by said second pump for supply to said second inlet port, said second fluid reservoir communicating with and positioned at a lower level relative to said first fluid reservoir; whereby, a fluid drained from said drain port and said power steering unit is initially returned to said first fluid reservoir and then an amount of the fluid in excess of a predetermined level in said first fluid reservoir overflows into said second fluid reservoir.

12. A working fluid supply system as set forth in claim 11, wherein said first valve is constituted by a first land formed on the power piston inner surface and a second land formed on the slide valve outer periphery, said second valve is constituted by a third land formed on the power piston inner surface and a fourth land formed on the slide valve outer periphery and said third valve is constituted by a fifth land formed on the power piston inner surface and a sixth land formed on the slide valve outer periphery.

13. A working fluid supply system for an automotive vehicle, comprising:
(a) a first pump driven by an engine of the automotive vehicle, said first pump having a fluid discharge rate which decreases below a predetermined level in response to an engine speed beyond a predetermined value;
(b) a second pump;
(c) control means for operating said second pump when the discharge rate of said first pump is less than the predetermined level;
(d) a hydraulic power boosting apparatus having:
(1) a housing with first and second communicating blind bores, a first inlet port communicating with said first pump and supplied with pressurized working fluid from said first pump, a second inlet port communicating with said second pump and supplied with pressurized working fluid therefrom when the discharge rate of said first pump is less than the predetermined level, an outlet port communicating with said second blind bore and a power steering unit, and a drain port communicating with fluid reservoir means of said first and second pumps for restoring the fluid thereto;
(2) a power piston slidably received within said housing first blind bore to subdivide said first bore into a drain chamber and a power boosting chamber, said power piston having a blind bore therein;
(3) a slide valve slidably received within said piston blind bore, one end of said slide valve being drivingly connected to a braking foot pedal through a connecting means;
(4) a first passageway communicating said first inlet port with said outlet port through a first valve;
(5) said first valve being open to permit the flow of the working fluid therethrough when said foot pedal is in a released position and being closed to prevent the flow of the working fluid therethrough when said foot pedal is in an applied position;

(6) a second passageway communicating said first inlet port with said power boosting chamber through a second valve;

(7) said second valve being closed to prevent the flow of the working fluid therethrough when said foot pedal is in a released position and being open to permit the flow of the working fluid therethrough when said foot pedal is in an applied position;

(8) a third passsageway communicating said power boosting chamber with said drain port through a third valve;

(9) said third valve being open to permit the flow of the working fluid therethrough when said foot pedal is in a released position and being closed to prevent the flow of the working fluid therethrough when said foot pedal is in an applied position;

(10) a fourth passageway communicating said second inlet port with said power boosting chamber;

(11) a fifth passageway communicating said first inlet port with said outlet port through a fourth valve;

(12) said fourth valve having a valve member slidably enclosed within said housing second belind bore and urged by a resilient member, said valve member adapted to shift against a set force of said resilient member to release a fluid pressure in excess of a predetermined pressure into said outlet port when an excessive fluid pressure is built up within said boosting apparatus;

(e) said power steering unit being operated by the pressurized working fluid supplied from said outlet port and being in communication with said fluid reservoir means for restoring the fluid thereto; and wherein said fluid reservoir means comprises:

(f) a first fluid reservoir in which the fluid is stored to be withdrawn by said first pump to be supplied to said first inlet port; and (g) a second fluid reservoir in which the fluid is stored to be withdrawn by said second pump to be supplied to said second inlet port, said second fluid reservoir communicating with and positioned at a lower level relative to said first fluid reservoir;

whereby, fluid drained from said drain port and said power steering unit is initially returned to said first fluid reservoir and then an amount of the fluid in excess of a predetermined level in said first fluid reservoir overflows into said second fluid reservoir.

14. A working fluid supply system as set forth in claim 13, wherein said first valve is constituted by a first land formed on the power piston inner surface and a second land formed on the slide valve outer periphery, said second valve is constituted by a third land formed on the power piston inner surface and a fourth land formed on the slide valve outer periphery and said third valve is constituted by a fifth land formed on the power piston inner surface and a sixth land formed on the slide valve outer periphery.

* * * * *